United States Patent [19]

Andrews et al.

[11] Patent Number: 5,051,328

[45] Date of Patent: Sep. 24, 1991

[54] PHOTOSENSITIVE IMAGING MEMBER WITH A LOW-REFLECTION GROUND PLANE

[75] Inventors: John R. Andrews; Yonn K. Simpson, both of Fairport, N.Y.

[73] Assignee: Xerox Corporation, Stamford, Conn.

[21] Appl. No.: 523,639

[22] Filed: May 15, 1990

[51] Int. Cl.[5] ..................... G01D 15/14; G03G 15/28; G03G 5/043

[52] U.S. Cl. ....................................... 430/56; 430/58; 430/60; 430/63; 430/530; 346/160; 355/233

[58] Field of Search ....................... 430/56, 58, 59, 60, 430/62, 63, 530

[56] References Cited

U.S. PATENT DOCUMENTS 4,582,772 4/1986 Teuscher et al. ................. 430/62 X
4,588,667 5/1986 Jones et al. ........................... 430/73
4,618,552 10/1986 Tanaka et al. ........................ 430/60
4,942,104 7/1990 Kitajima et al. ...................... 430/56
4,942,105 7/1990 Yu .................................... 430/56 X

FOREIGN PATENT DOCUMENTS 250653 10/1988 Japan .................................... 430/63
223467 9/1989 Japan .................................... 430/56

*Primary Examiner*—Roland Martin

[57] ABSTRACT

A layered photosensitive imaging member is modified to reduce the effects of interference within the member caused by reflections from coherent light incident on a base ground plane. The modification described is to form the ground plane of a low-reflecting material such as tin oxide or indium tin oxide. An additional feature is to add absorbing materials to the dielectric material upon which the ground plane is formed to absorb secondary reflections from the anti-curl back coating layer air interface.

2 Claims, 4 Drawing Sheets

PHOTOSENSITIVE IMAGING MEMBER WITH A LOW-REFLECTION GROUND PLANE

BACKGROUND AND PRIOR ART STATEMENT

The present invention relates to an imaging system using coherent light radiation to expose a layered member in an image configuration and, more particularly, to a means and method for suppressing optical interference occurring within said photosensitive member which results in a defect that resembles the grain in a sheet of plywood in output prints derived from said exposed photosensitive member when the exposure is a uniform, intermediate-density gray.

There are numerous applications in the electrophotographic art wherein a coherent beam of radiation, typically from a helium-neon or diode laser is modulated by an input image data signal. The modulated beam is directed (scanned) across the surface of a photosensitive medium. The medium can be, for example, a photoreceptor drum or belt in a xerographic printer, a photosensor CCD array, or a photosensitive film. Certain classes of photosensitive medium which can be characterized as "layered photoreceptors" have at least a partiallytransparent photosensitive layer overlying a conductive ground plane. A problem inherent in using these layered photoreceptors, depending upon the physical characteristics, is the creation of two dominant reflections of the incident coherent light on the surface of the photoreceptor; e.g., a first reflection from the top surface and a second reflection from the top surface of the relatively opaque conductive ground plane. This condition is shown in FIG. 1; coherent beams 1 and 2 are incident on a layered photoreceptor 6 comprising a charge transport layer 7, charge generator layer 8, and a ground plane 9. The two dominant reflections are: from the top surface of layer 7, and from the top surface of ground plane 9. Depending on the optical path difference as determined by the thickness and index of refraction of layer 7, beams 1 and 2 can interfere constructively or destructively when they combine to form beam 3. When the additional optical path traveled by beam 1 (dashed rays) is an integer multiple of the wavelength of the light, constructive interference occurs, more light is reflected from the top of charge transport layer 7 and, hence, less light is absorbed by charge generator layer 8. Conversely, a path difference producing destructive interference means less light is lost out of the layer and more absorption occurs within the charge generator layer 8. The difference in absorption in the charge generator layer 8, typically due to layer thickness variations within the charge transport layer 7, is equivalent to a spatial variation in exposure on the surface. This spatial exposure variation present in the image formed on the photoreceptor becomes manifest in the output copy derived from the exposed photoreceptor. FIG. 2 shows the areas of spatial exposure variation (at 25x) within a photoreceptor of the type shown in FIG. 1 when illuminated by a He-Ne laser with an output wavelength of 633 nm. The pattern of light and dark interference fringes look like the grains on a sheet of plywood. Hence the term "plywood effect" is generically applied to this problem.

One method of compensating for the plywood effect known to the prior art is to increase the thickness of and, hence, the absorption of the light by the charge generator layer. For most systems, this leads to unacceptable tradeoffs; for example, for a layered organic photoreceptor, an increase in dark decay characteristics and electrical cyclic instability may occur. Another method, disclosed in U.S. Pat. No. 4,618,552 is to use a photoconductive imaging member in which the ground plane, or an opaque conductive layer formed above or below the ground plane, is formed with a rough surface morphology to diffusely reflect the light.

According to the present invention the plywood effect is significantly reduced by suppressing the interference fringes produced by strong reflections from the conductive substrate. This is accomplished by replacing the present ground plane by a conductive transparent low-reflectivity ground plane. In a further embodiment, an electrically inactive absorbing layer is added to the back of the substrate upon which the ground plane is formed. More particularly, the invention relates to a photosensitive imaging member comprising at least a transparent photoconductive charge transport layer, overlying a charge generator layer and a conductive ground plane characterized by said ground plane being of a transparent and low-reflection material.

DESCRIPTION OF THE INVENTION

Figure 3:
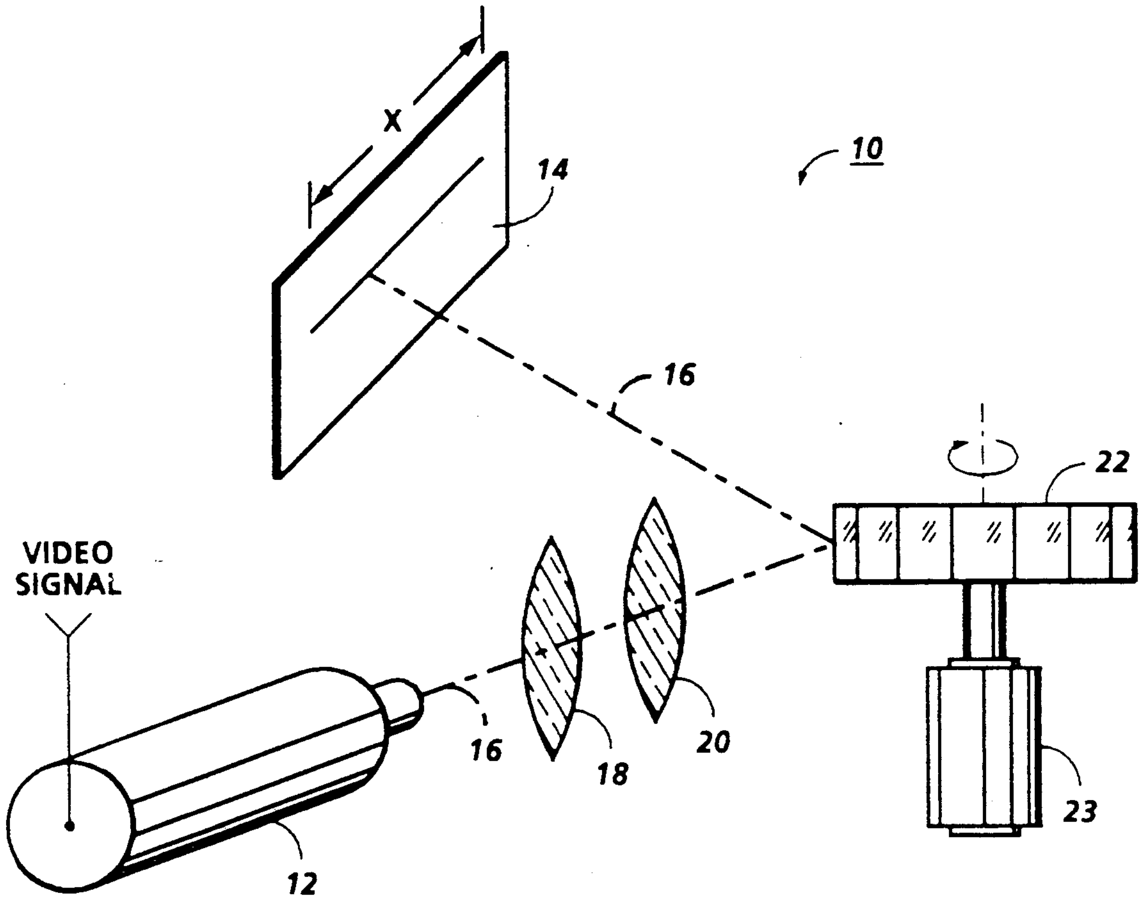
FIG. 3 is a schematic representation of an optical system incorporating a coherent light source to scan a light beam across a photoreceptor modified to reduce the interference effect according to the present invention.

FIG. 3 shows an imaging system 10 wherein a laser 12 produces a coherent output which is scanned across photoreceptor 14. In response to video signal information representing the information to be printed or copied, the laser diode is driven so as to provide a modulated light output beam 16. Flat field collector and objective lens 18 and 20, respectively, are positioned in the optical path between laser 12 and light beam reflecting scanning device 22. In a preferred embodiment, device 22 is a multi-faceted mirror polygon driven by motor 23, as shown. Flat field collector lens 18 collimates the diverging light beam 16 and field objective lens 20 causes the collected beam to be focused onto photoreceptor 14 after reflection from polygon 22. Photoreceptor 14, in a preferred embodiment, is a layered photoreceptor shown in partial cross-section in FIG. 4.

Figure 4:
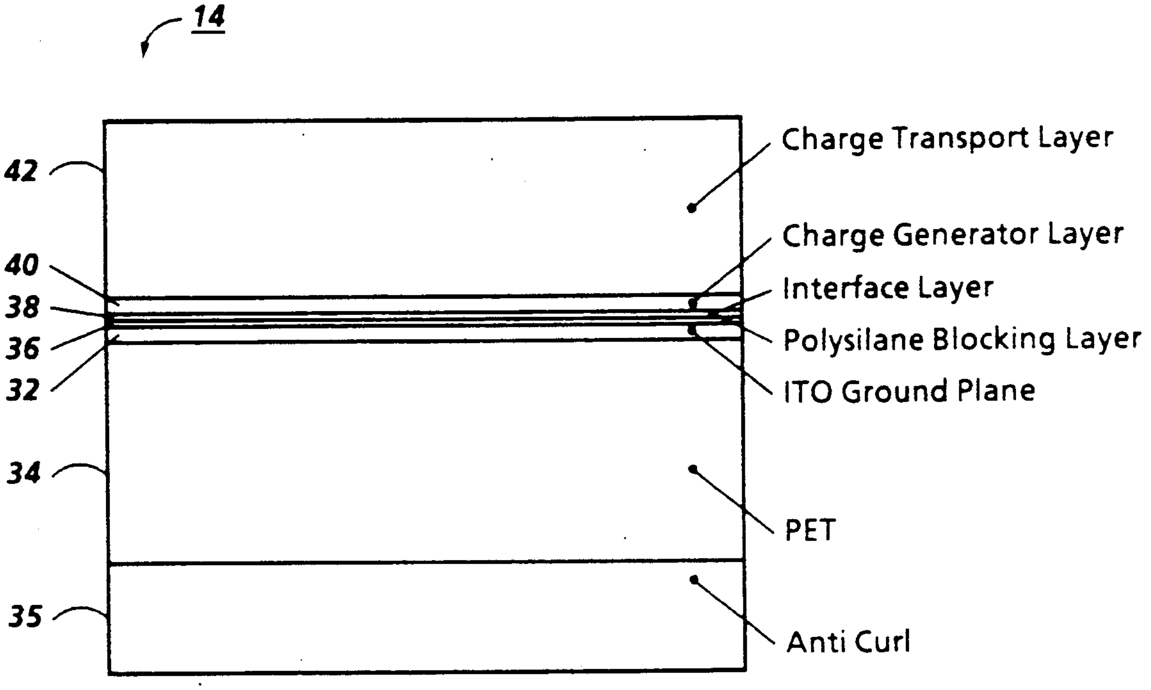
FIG. 4 is a cross-sectional view of the photoreceptor of FIG. 3.

Referring to FIG. 4, photoreceptor 14 is a layered photoreceptor which includes a transparent conductive ground plane 32 formed on a dielectric substrate 34 (typically polyethylene terephthalate (PET)). Substrate 34 has, as is conventional, a anti-curl coating 35 on the bottom surface thereof. As is conventional in the art, ground plane 32 has formed thereon a polysilane layer 36 whose function is to act as a blocking layer. Formed on top of blocking layer 36 is layer 38 whose function is to act as an adhesion layer. Charge generator layer 40 and charge transport layer 42 are conventionally formed according to the teachings of U.S. Pat. No. 4,588,667, whose contents are hereby incorporated by reference. Layers 36, 38, 40, and 42 are all transparent to incident light and have approximately the same refractive index.

According to a first aspect of the invention, conductive ground plane 32 is a transparent and low refractive index conductor. In a preferred embodiment, ground plane 32 is indium tin oxide with a refractive index of 1.9.

Figure 1:
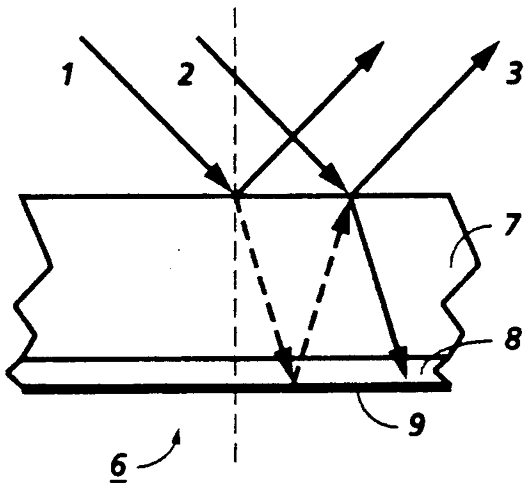
FIG. 1 PRIOR ART
FIG. 1 shows coherent light incident upon a prior art layered photosensitive medium leading to reflections internal to the medium.
Figure 2:
FIG. 2 shows a spatial exposure variation plywood pattern in the exposed photosensitive medium of FIG. 1 produced when the spatial variation in the absorption within the photosensitive member occurs due to an interference effect.

The indium tin oxide is preferentially formed to a thickness of some multiple of the incident wavelength. Thus, for example, if laser source 12 is a helium-neon laser, output beam 16 has a wavelength λ of 632.8 nm. At ½ wavelength thickness, ground plane 34 will be λ/2n thick. If n=1.9 and λ=632.8 nm, the ground plane 34 will be approximately 0.167f microns or 167f nm thick. At this ½ wavelength optical thickness value, little, of the light passing through the layers overlying ground plane 34 is reflected; e.g., the light is transmitted through the ground plane. Thus, the only relatively strong reflections which serve to form an undesirable spatial variation exposure at the surface of layer 42 is the approximately 4% reflection from that surface and an additional approximately 4% reflection at the air/anti-curl layer 35 interface. This embodiment thus effectively eliminates the type of exposure variation pattern shown in FIG. 2. Output prints exhibit virtually no plywood effect defects.

According to a second aspect of the invention the 4% reflection from the anti-curl layer air interface is eliminated by adding selected dye materials either to the PET substrate 34 or the anti-curl layer 35 to absorb the light reflected from the interface. One example of a suitable dye material is Sudan Blue 670™. The exact degree of absorption to be accomplished depends on the system requirements. For some systems using a charge erase directed from the back of the photoreceptor (upward through anti-curl layer 35) there may be some trade-off in reducing the absorbing proportion of the anti-curl layer to allow for sufficient light transmission to effect discharge at the ground plane.

Figure 5:
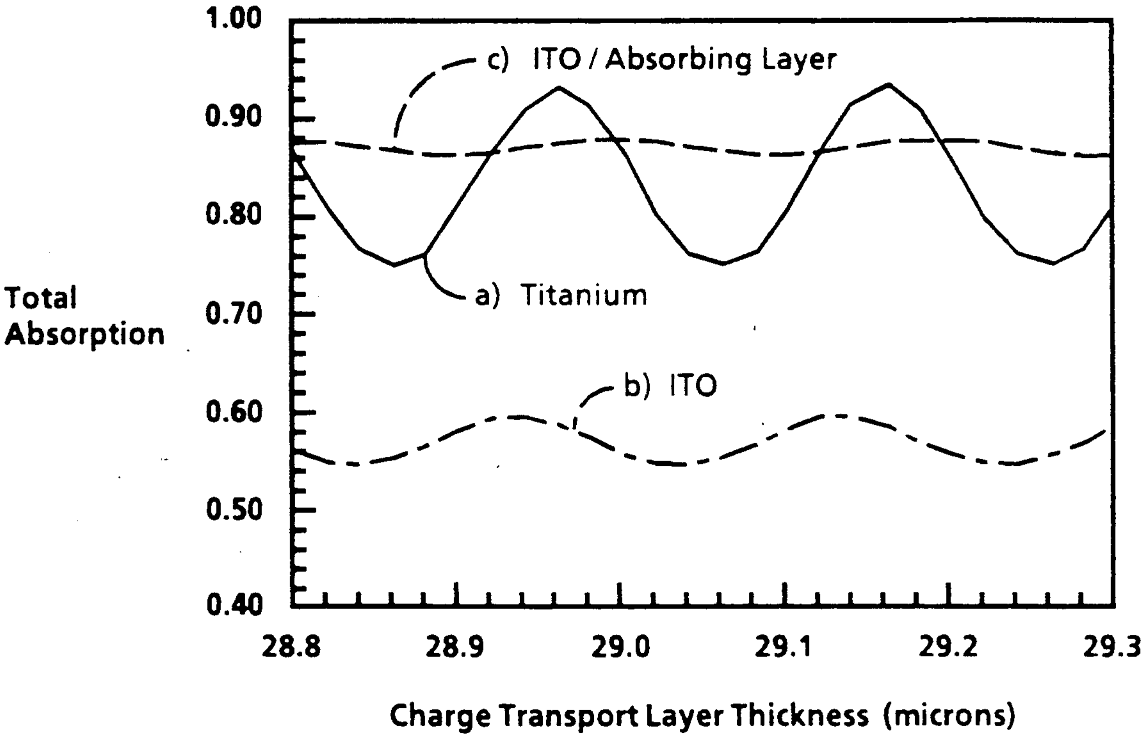
FIG. 5 is a plot of total absorption versus transport layer thickness for a ground plane as shown in FIG. 4 comprising a) conventional ground plane comprising titanium, b) an indium tin oxide (ITO) ground plane, and c) a combination of an ITO ground plane with an absorbing anti-curl layer.

FIG. 5 shows a plot of the total absorption of the incident light within the photoreceptor as a function of the charge transport layer thickness. Three cases are shown: a low-reflection ground plane comprising indium tin oxide both with and without an absorbing anti-curl layer and, also shown for comparison purposes, a conventional opaque titanium ground plane. The absorption is plotted against transport layer thickness, the modulation in the absorption correlates directly to the interference fringe contrast with larger magnitude modulations signifying strong plywood fringe contrast in the final print. Conversely, small magnitude modulation results in weak plywood fringe contrast in the final print. Thus, plot c (ITO used with an absorbing layer) is more preferable than plot b (ITO layer alone) which is in turn more preferable to the titanium ground plane, (plot a). Other acceptable low-reflection materials for the ground plane can be tin oxide or silver halide salt materials.

The optimum thickness of the ITO ground plane sandwiched between materials having nearly the same refractive index as in the photoreceptor structure is kλ/2n, where k is an integer, λ is the light wavelength for exposure of the photoreceptor and n is the refractive index. Other thicknesses for the ITO will have a higher reflectivity and thus are not optimum. Even non-optimum thicknesses for the ITO have lower reflectivity than conventional ground planes and consequently substantially reduced plywood. For instance, the ITO thickness having maximum reflectivity, λ/4n, will have a reflectivity less than 10%.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. A photosensitive imaging member adapted to be exposed by radiation from a coherent light source, said member comprising at least a transparent photoconductive charge transport layer overlying a charged generator layer and a conductive ground plane, said ground plane comprising a transparent low-reflection material, and further including a substrate comprising a dielectric substrate layer with an anti-curl coating on the bottom surface, the anti-curl coating being adapted to absorb light reflected from the anti-curl layer/air interface.

2. A raster output scanning system comprising; means for generating a beam of high intensity, modulated coherent light, optical means for imaging said beam onto the surface of a photosensitive image recording medium, said recording medium comprising at least a transparent photoconductive charge transport layer, overlying a charge generator layer and a conductive ground plane, said ground plane comprising a transparent low-reflection material and wherein said transport layer, charge generator layer and ground plane have approximately the same index of refraction n and wherein the ground plane has an optimum thickness given by the expression t=kλ/2n where k is an integer, and is λ the wavelength of the coherent light.

* * * * *